US00RE43494E

(19) United States
(12) Reissued Patent
Anvekar et al.

(10) Patent Number: US RE43,494 E
(45) Date of Reissued Patent: Jun. 26, 2012

(54) FREQUENCY LOOK-AHEAD AND LINK STATE HISTORY BASED SCHEDULING IN INDOOR WIRELESS PICO-CELLULAR NETWORKS

(75) Inventors: Dinesh Kashinath Anvekar, Bangalore (IN); Manika Kapoor, Sunnyvale, CA (US)

(73) Assignee: WISTRON Corporation, Taipei (TW)

(21) Appl. No.: 11/981,508

(22) Filed: Oct. 31, 2007

Related U.S. Patent Documents

Reissue of:
(64) Patent No.: 6,961,363
Issued: Nov. 1, 2005
Appl. No.: 09/452,802
Filed: Dec. 2, 1999

(51) Int. Cl.
*H04B 1/69* (2006.01)

(52) U.S. Cl. ..... 375/132; 375/141

(58) Field of Classification Search ..... 375/132, 375/138, 141, 356; 370/276, 281, 282, 294, 370/302, 321, 344, 347, 442, 458, 379; 455/450–452
See application file for complete search history.

(56) References Cited

U.S. PATENT DOCUMENTS 5,276,686 A * 1/1994 Ito ..... 370/330
5,394,433 A * 2/1995 Bantz et al. ..... 375/132
5,425,031 A * 6/1995 Otsuka ..... 370/336
5,455,959 A * 10/1995 Simmering ..... 710/18
5,588,005 A * 12/1996 Ali et al. ..... 370/346
5,781,582 A * 7/1998 Sage et al. ..... 375/134
5,914,947 A * 6/1999 Saito ..... 370/337
5,936,211 A * 8/1999 Kim ..... 187/248
6,014,406 A * 1/2000 Shida et al. ..... 375/133
6,028,853 A * 2/2000 Haartsen ..... 370/338
6,031,864 A * 2/2000 Bauchot et al. ..... 375/133
6,094,426 A * 7/2000 Honkasalo et al. ..... 370/331
6,212,221 B1 * 4/2001 Wakayama et al. ..... 375/133
6,223,048 B1 * 4/2001 Noll Barreto et al. ..... 455/517
6,256,356 B1 * 7/2001 Suzuki ..... 375/260
6,295,310 B1 * 9/2001 Yamauchi et al. ..... 375/133
6,347,228 B1 * 2/2002 Ludden et al. ..... 455/456.5
6,351,461 B1 * 2/2002 Sakoda et al. ..... 370/335
6,424,820 B1 * 7/2002 Burdick et al. ..... 455/41.1
6,484,268 B2 * 11/2002 Tamura et al. ..... 713/600
6,501,942 B1 * 12/2002 Weissman et al. ..... 455/14
6,532,228 B1 * 3/2003 Burgess et al. ..... 370/349
6,570,857 B1 * 5/2003 Haartsen et al. ..... 370/312
6,587,444 B1 * 7/2003 Lenzo et al. ..... 370/330
6,603,747 B2 * 8/2003 Asai ..... 370/322
6,683,886 B1 * 1/2004 van der Tuijn et al. ..... 370/458
2001/0040878 A1 * 11/2001 Schilling ..... 370/329

* cited by examiner

*Primary Examiner* — Emmanuel Bayard
(74) *Attorney, Agent, or Firm* — Claude A. S. Hamrick; IPXLAW Group LLP

(57) ABSTRACT

A method and apparatus of combating the problem of interference in master-slave time division duplex indoor wireless networks based on standards, such as the Bluetooth™ standard, is proposed. The method involves a frequency look-ahead scheme in frequency hopping systems, a scheme of monitoring states of master-slave wireless communication links through values recorded in link history counters, and a scheme of scheduling an appropriate slave unit and choosing a suitable packet size to overcome the effect of interfering sources, if any, in the pico-cell.

30 Claims, 11 Drawing Sheets k: POSITIVE INGER

FREQUENCY LOOK-AHEAD AND LINK STATE HISTORY BASED SCHEDULING IN INDOOR WIRELESS PICO-CELLULAR NETWORKS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to time division duplex indoor wireless communication networks and, more particularly, to a frequency look-ahead, packet/slave scheduling scheme and master/slave link characterization using a link state history table in the master unit in order to account for channel and system characteristics.

2. Background Description

Bluetooth™ is a computing and telecommunications industry specification that describes how mobile phones, computers, personal digital assistants (PDAs), and other devices can interconnect using a short range wireless connection. Each device is equipped with a microchip transceiver that transmits and receives in the frequency band of 2.45 GHz. Each device will have a unique 48-bit address from the IEEE 802 standard. Connections are one-to-one, and the maximum range is ten meters. Data can be exchanged at a rate of one megabits per second (Mbs) and up to two Mbs in the second generation of the technology. The five founding companies of the Bluetooth™ Special Interest Group (SIG) are Ericsson, IBM, Intel, Nokia, and Toshiba. Additional information may be had by reference to the Web site www.bluetooth.com and an article by Andrew Seybold entitled "Bluetooth Technology: The Convergence of Communications and Computing", reprinted from Andrew Seybold's Outlook, May 1998, on the World Wide Web at www.gsmdata.com/artblue.htm.

Indoor wireless networks based on standards such as Bluetooth™ use frequency hopping to combat the problem of interference from sources such as microwave ovens and cordless telephones, which also use frequencies in the same band. In practical environments, in addition to active interfering sources, there can also be objects such as water fountains and racks of bottles with water content which absorb much of the radiation in the 2.45 GHz band and obstruct communication between master and slave units in the vicinity. Therefore, a master unit needs to detect such problems in communication and take necessary actions to prevent loss of packets during the periods of interference.

In the current Bluetooth™ standard, due to frequency hopping, the carrier frequency used in consecutive time slots is a different one of several different frequencies within the 2.45 GHz band of frequencies. Therefore, an interference in sub-bands centered around one of these frequencies will only affect communication during that time-slot in which the frequency sub-band is used. Further, in the Bluetooth™ standard, a packet can occupy one, three or five time slots, and in the case of multiple size packets, the same frequency as fixed for the first time slot is used. Because of this, it is possible to mask the effect of an interference by transmitting a packet of appropriate size. For example, if it is known that there is high chance of interference in one of the second through fifth time slots, and very low probability of the first time slot being bad, it is possible to skip the frequencies corresponding to second through fifth time slots by transmitting a five time-slot packet instead of one or three time-slot packets.

The characterization of link between any slave unit and the master can be done by the master unit based on the receipt or otherwise of acknowledgments received from the slave. Alternatively, all the slaves can record the number of times they detect good packet headers sent by the master to any slave. This information can be transmitted from the slaves to the master at periodic intervals of time. The master can use this information along with frequency look-ahead to determine the next slave for communication and also the appropriate packet size.

Several methods and schemes to combat the effect of interference in cellular wireless communication systems have been proposed. For example, a Fast Fourier Transform (FFT) based adaptive interference cancellation method has been proposed in U.S. Pat. No. 5,612,978 to Blanchard et al for "Method and Apparatus for Real-time Adaptive Interference Cancellation in Dynamic Environments". The method allows relatively fast changes in the interference environment to be tracked and rejected.

In the U.S. Pat. No. 5,541,954 to Emi et al. for "Frequency Hopping Communication Method and Apparatus Changing a Hopping Frequency as a Result of a Counted Number of Errors", a technique of changing the hopping frequency based on the number of errors encountered on a given frequency is proposed. This scheme is suitable in systems where the hopping frequency can be changed at any time.

Another related invention can be found in U.S. Pat. No. 5,323,447 to Gillis et al. for "Apparatus and Method for Modifying a Frequency Hopping Sequence of a Cordless Telephone Operating in a Frequency Hopping Domain", in which the hopping sequence is modified for a cordless telephone. Substitute alternative communication channels are identified and then substituted for those communication channels experiencing interference. This is done without disrupting the communications between the handset unit and its associated base unit.

In systems in which the hopping frequency is fixed depending on the frequency hopping sequence corresponding any given pico-cell, there is need for other methods to combat the problem of interference. In U.S. Pat. No. 5,570,352 to Pöyhönen for "Digital Cellular Network/System with Mobile Stations Communicating with Base Stations Using Frequency-Hopping and Having Enhanced Effect of Interference Diversity", frequency hopping utilizing interference diversity is presented.

In U.S. Pat. No. 5,659,879 to Dupuy for "Method of Covering Shadow Areas in a Cellular Mobile Radio and Radio Booster for Implementing this Method", the problem of covering shadow areas by using radio boosters is addressed. To cover the shadow areas, a radio signal received by a radio booster from the base transceiver station on a basic frequency is re-transmitted to a mobile station on a translated frequency different from the basic frequency and associated with the latter by a translation law.

SUMMARY OF THE INVENTION

It is therefore an object of the present invention to provide a method to combat the effect of interfering sources in frequency hopping based indoor wireless networks.

According to the invention, a method of combating the problem of interference from external sources and shadowing objects in indoor pico-cellular wireless networks utilizes frequency look-ahead and short-term history about channel state with reference to different mobile units within a pico-cell.

The method monitors the states of master-slave wireless communication links through values recorded in link counters. Based on the recorded values, an appropriate slave is scheduled and the suitable packet size chosen to overcome the effect of interfering sources if any in the pico-cell.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

In the current Bluetooth™ indoor wireless networking standard, the master unit and slave units in any given pico-cell use the same frequency hopping sequence to communicate with each other. In each unit, there is a frequency selection unit (FSU) which produces a frequency index for one of several possible frequencies. The inputs to the frequency selection unit are the address bits of the pico-cell master and the current clock bits in each unit. When a master or slave has to transmit or receive information over the wireless medium, the frequency index is used to synthesize the appropriate frequency in the frequency hopping sequence of the pico-cell. As all the units in a pico-cell use the same address of the master for determining the frequency in any slot, the same hopping sequence is used by all of them. However, as the clocks of the different units are not synchronized, each unit uses a corresponding offset with reference to the clock of the master.

Each time slot in the Bluetooth™ standard occupies 625 micro-seconds. The master always begins transmission on an even time slot, and a slave always begins transmission on an odd time slot. A slave unit can transmit to the master on an up-link slot only if the master had transmitted to that slave on the preceding down-link slot. The frequencies used on adjacent time slots by master or slave units are chosen to be different based on the frequency hopping sequence for the pico-cell.

Figure 1:
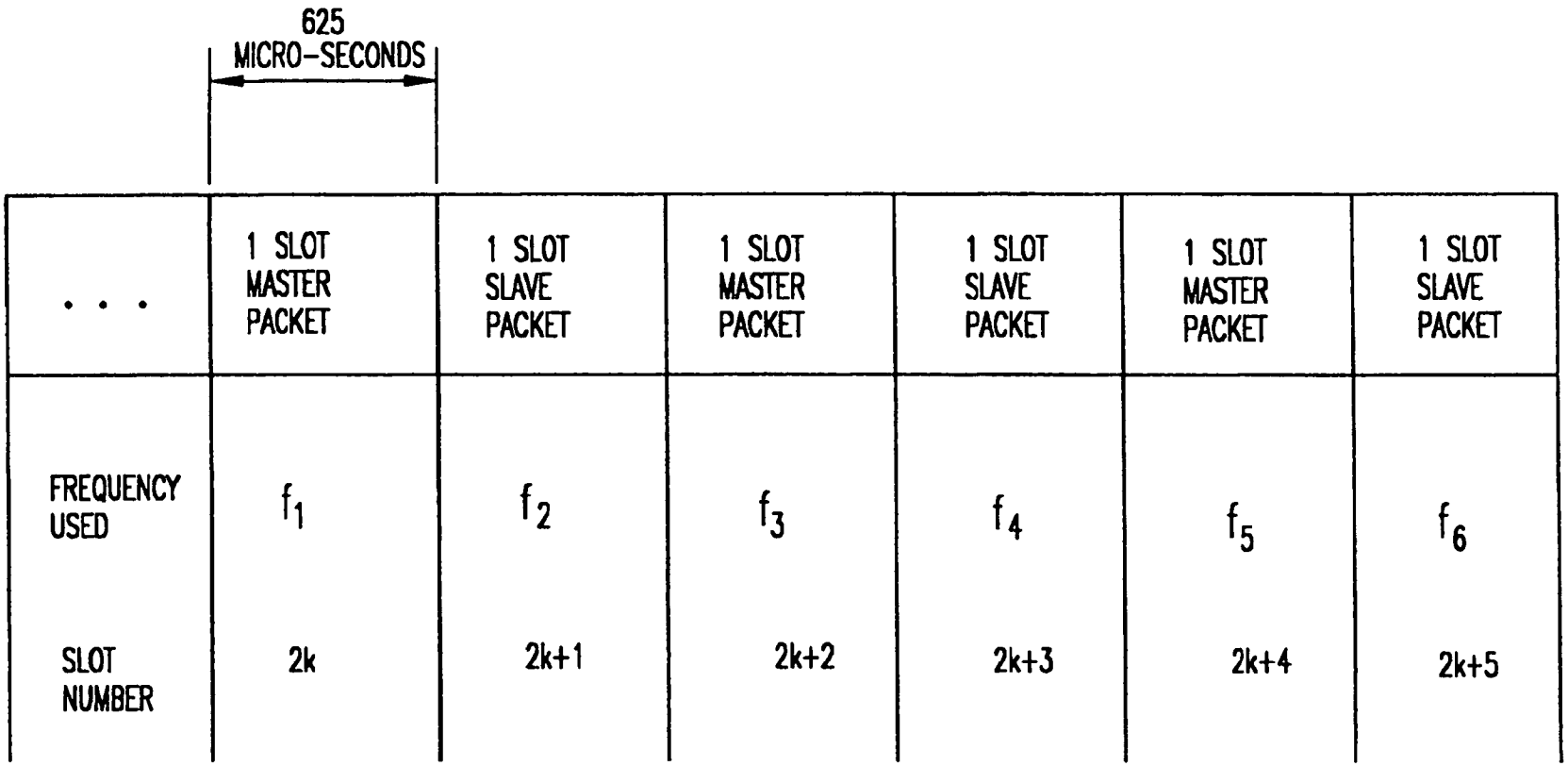
FIG. 1 is a timing diagram showing frequency hopping time slots and frequencies.
Figure 2:
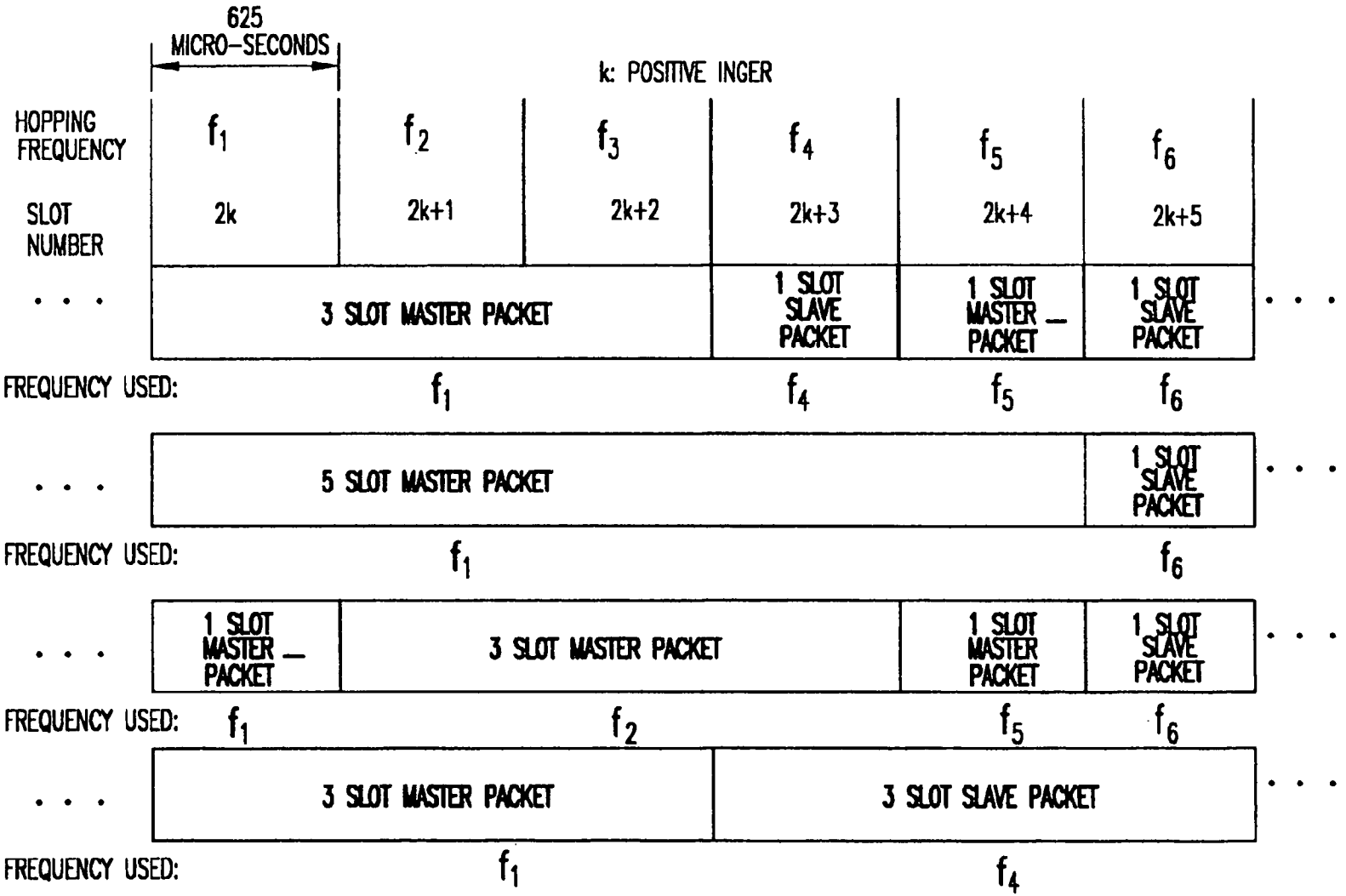
FIG. 2 is a timing diagram showing examples of multi-slot master/slave transmissions.

A schematic representation of hopping frequencies used during consecutive time slots is shown in FIG. 1. Here, for simplicity in illustration only one-slot packets have been shown. However, in general, a master or slave can also transmit packets of size three or five time-slots. Also, the frequency used during the entire three or five size packet transmission is the same as that for the first time slot in which the packet transmission started, as seen in the examples for frequencies used during multi-slot packet transmissions shown in FIG. 2. It is to be noted that in the currently proposed standard, there is no frequency look-ahead with reference to the frequency hopping sequence.

Frequency Look-Ahead

Figure 3:
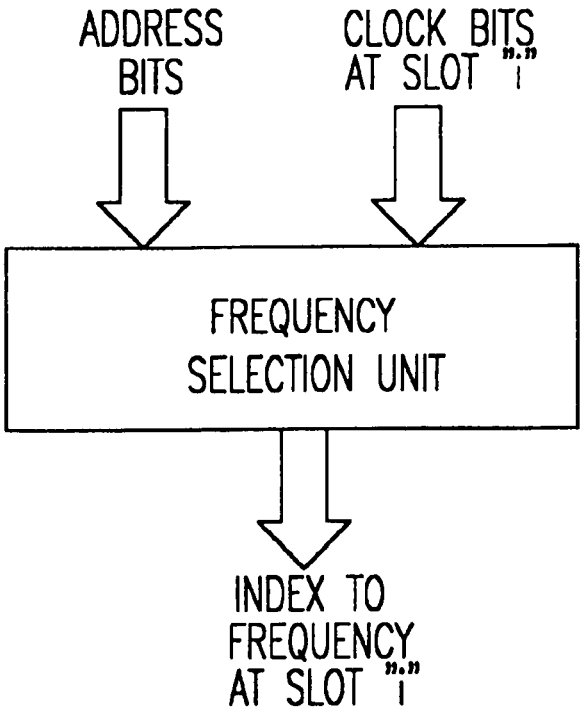
FIG. 3 is a block diagram of a frequency selection unit (FSU)

A preferred embodiment of the invention comprises frequency look-ahead to know at any point of time the frequencies that will be used during the future time slots by the master and slave units. A frequency selection unit FSU) as shown in block diagram form in FIG. 3 is used to find the current frequency on which to transmit or receive. The FSU receives address bits and clock bits at slot "i" and outputs an index to the frequency at slot "i". The FSU is basically a combinatorial logic unit comprising functions of addition, exclusive-OR, and permutation operations.

Figure 4:
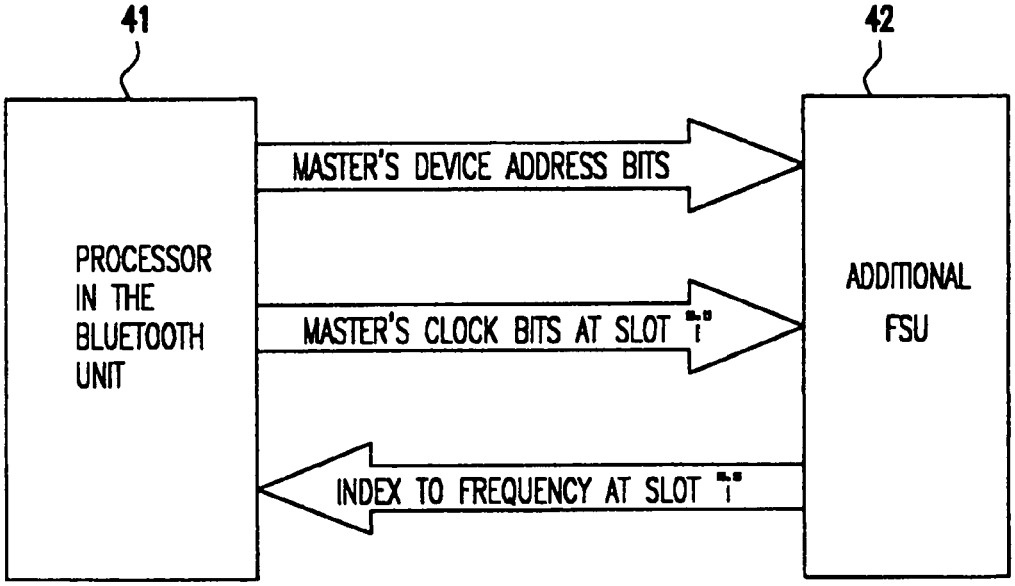
FIG. 4 is a block diagram of the interface between a processor and an additional frequency selection unit (FSU)

In the present invention, an additional FSU is used to find the frequencies corresponding to future time slots, as shown in block diagram form in FIG. 4. The processor 41 in the master unit obtains the frequency corresponding to any time slot by providing as inputs to the additional FSU 42 the address bits and the appropriate clock bits. With this scheme, frequencies corresponding to next "k" time slots are obtained by the processor sequentially.

Figure 5:
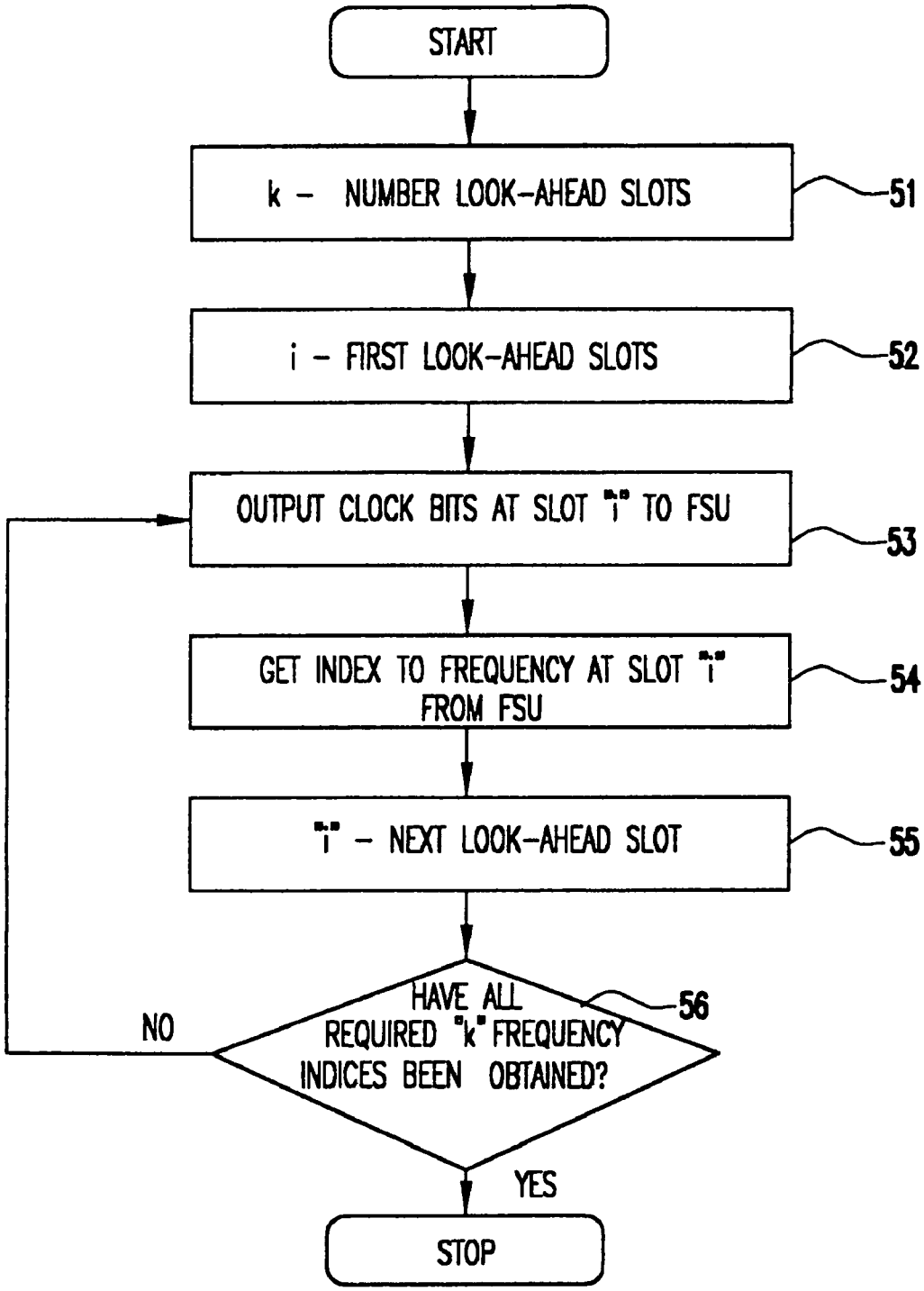
FIG. 5 is a flowchart for sequential look-ahead for "k" time slot frequencies.

The process is shown in the flowchart shown in FIG. 5. The process begins by setting k to be equal to the number of look-ahead slots in function block 51 and setting i to be equal to the first look-ahead slot in function block 52. After this initialization, the process enters a processing loop which begins with the processor (41 in FIG. 4) outputting clock bits at slot "i" to the FSU (42 in FIG. 4) in function block 53. Next, the processor gets the index to the frequency at slot "i" from the processor in function block 54. "i" is set to the next look-ahead slot in function block 55. A test is made in decision block 56 to determine if all the required "k" indices have been obtained. If not, the process loops back to function block 53; otherwise, the process stops.

While look-ahead for sequential time slots is implied in this flowchart, the master can in general look-ahead for future time slots in any arbitrary order by just providing the clock bits corresponding to the required time slots.

Link State History

Another feature of the invention is maintaining the information about link state with reference to each frequency of operation and each active slave. In the present invention, this information is contained in a counter corresponding to each slave-frequency pair. The master unit maintains a table of counters as shown in Table 1. In Table 1, "C(i,j)" represents the counter for link state of frequency $f_j$ for slave i.

TABLE 1

Link State History Table of Counters

| | $f_1$ | $f_2$ | $f_3$ | . . . | $f_{78}$ | $f_{79}$ |
|---|---|---|---|---|---|---|
| SLAVE 1 | C(1,1) | C(1,2) | C(1,3) | . . . | C(1,78) | C(1,79) |
| SLAVE 2 | C(2,1) | C(2,2) | C(2,3) | . . . | C(2,78) | C(2,79) |
| SLAVE 3 | C(3,1) | C(3,2) | C(3,3) | . . . | C(3,78) | C(3,79) |
| SLAVE 4 | C(4,1) | C(4,2) | C(4,3) | . . . | C(4,78) | C(4,79) |

TABLE 1-continued

| Link State History Table of Counters | | | | | | |
|---|---|---|---|---|---|---|
| | $f_1$ | $f_2$ | $f_3$ | ... | $f_{78}$ | $f_{79}$ |
| SLAVE 5 | C(5,1) | C(5,2) | C(5,3) | ... | C(5,78) | C(5,79) |
| SLAVE 6 | C(6,1) | C(6,2) | C(6,3) | ... | C(6,78) | C(6,79) |
| SLAVE 7 | C(7,1) | C(7,2) | C(7,3) | ... | C(7,78) | C(7,79) |

Here, seven rows corresponding to seven slaves have been shown because, in each pico-cell a maximum of seven active slaves are allowed at any time. However, the number of rows in the table during any period of time is equal to the number of active slaves in the pico-cell during that period. Also, the number of columns in the table is equal to the number of hopping frequencies used in the system. In the current standard, the number of hopping frequencies is 79 (or 23 when operating in some countries of the world).

Figure 6:
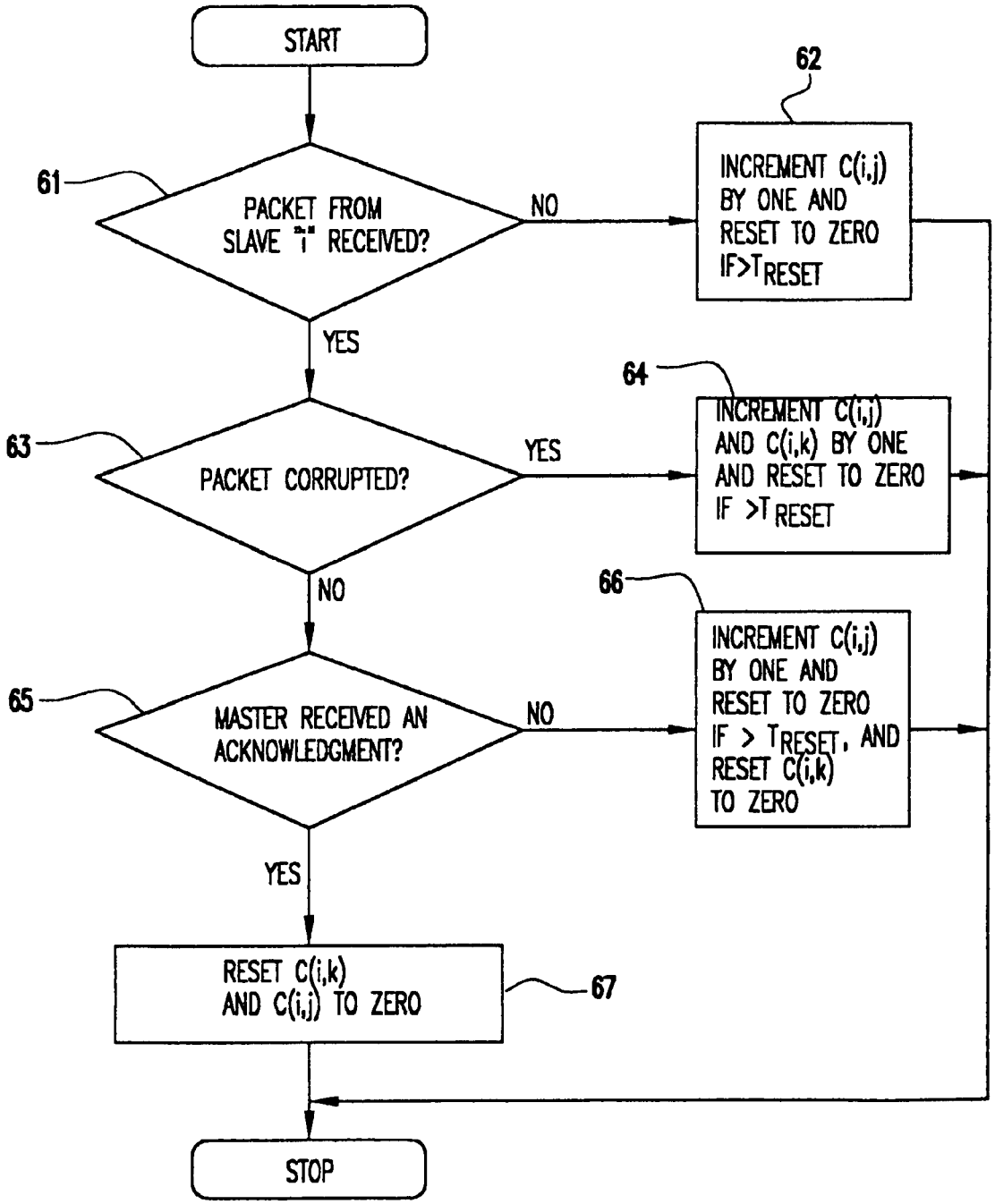
FIG. 6 is a flowchart for updating the link state history counters.

Initially, all the counters are reset to zero, and during transmissions the counter values are changed depending on the success or failure of a packet transmission between the master and a slave. Counter C(i,j) and C(i,k) corresponding to slave "i" and frequencies $f_j$ and $f_k$ are updated as shown in the flowchart of FIG. 6. Here, $f_j$ is the frequency of transmission by the master and $f_k$ is the frequency on which a slave's packet is received. In decision block 61, a test is made to determine if a packet has been received from slave "i". If not, the counter C(i,j) is incremented by one in function block 62. If the value of the counter exceeds a threshold value $T_{RESET}$ after being incremented, the counter is reset. If the packet has been received, then a further test is made in decision block 63 to determine if the packet is corrupted. If so, the counters C(i,j) and C(i,k) are each incremented by one in function block 64. If the values of either of the counters exceeds the threshold value $T_{RESET}$ after being incremented, the counter is reset. If the received packet is not corrupted, a further test is made in decision block 65 to determine if the master received an acknowledgment. If not, the counter C(i,j) is incremented by one and the counter C(i,k) is reset in function block 66. If the value of the counter C(i,j) exceeds a threshold value $T_{RESET}$ after being incremented, it is reset. If the master received an acknowledgment, the counters C(i,j) and C(i,k) are reset to zero in function block 67.

As shown in FIG. 6, both counters C(i,j) and C(i,k) are incremented by one when either no packet or a corrupted packet is received. Also, counter C(i,j) is incremented by one when the master receives a no-acknowledgment signal through a correctly received packet. Also as indicated in the flowchart, counter C(i,j) or counter C(i,k) are reset to zero if their count value is greater than a threshold $T_{RESET}$ after an increment operation. When an acknowledgment signal is received through a correctly received slave's packet, it indicates that the master's transmission was successfully received and the slave's transmission frequency also has no interference. Therefore, both the counters C(i,j) and C(i,k) are reset to zero.

At the time of deciding about transmission to a slave "i", if counter C(i,j) value is less than or equal to a threshold value $T_{TRANSMIT}$, a packet transmission is made to the slave. However, if counter C(i,j) value is greater than $T_{TRANSMIT}$, then no transmission is sent to slave "i" at frequency $f_j$ during the scheduled time slot for the slave, and the counter C(i,j) is incremented by one. After the increment operation, if value of counter C(i,j) is greater than a threshold $T_{RESET}$, the counter is reset to zero. The counters C(i,j) start with an initial value of zero, and with progressive communications between the master and the slaves, assume different values depending on the relative positions of the mobile units and the nature and location of interfering sources. The two counter thresholds $T_{TRANSMIT}$ and $T_{RESET}$ are useful to distinguish between transient and persistent errors on a link. If a master-slave link on a certain frequency is affected with very short-term interference, then before the threshold $T_{TRANSMIT}$ is exceeded, the master gets an acknowledgment for one of its packets sent to the slave, and the corresponding counter is reset. However, if the inference is persistent, with repeated transmission failures, the threshold $T_{TRANSMIT}$ is soon reached and no further attempts to transmit to the slave at that frequency are made for ($T_{RESET}-T_{TRANSMIT}$) scheduled time slots for the slave. Thus, for each master-slave link $T_{TRANSMIT}$ consecutive attempts are allowed and thereafter ($T_{RESET}-T_{TRANSMIT}$) period of back-off time is provided. During this back-off period, other slaves can be scheduled for transmission. The values of $T_{TRANSMIT}$ and $T_{RESET}$ are fixed depending on the desired number of transmission attempts at any frequency and the required back-off time.

Slave Scheduling and Packet Size Determination

Figure 7A:
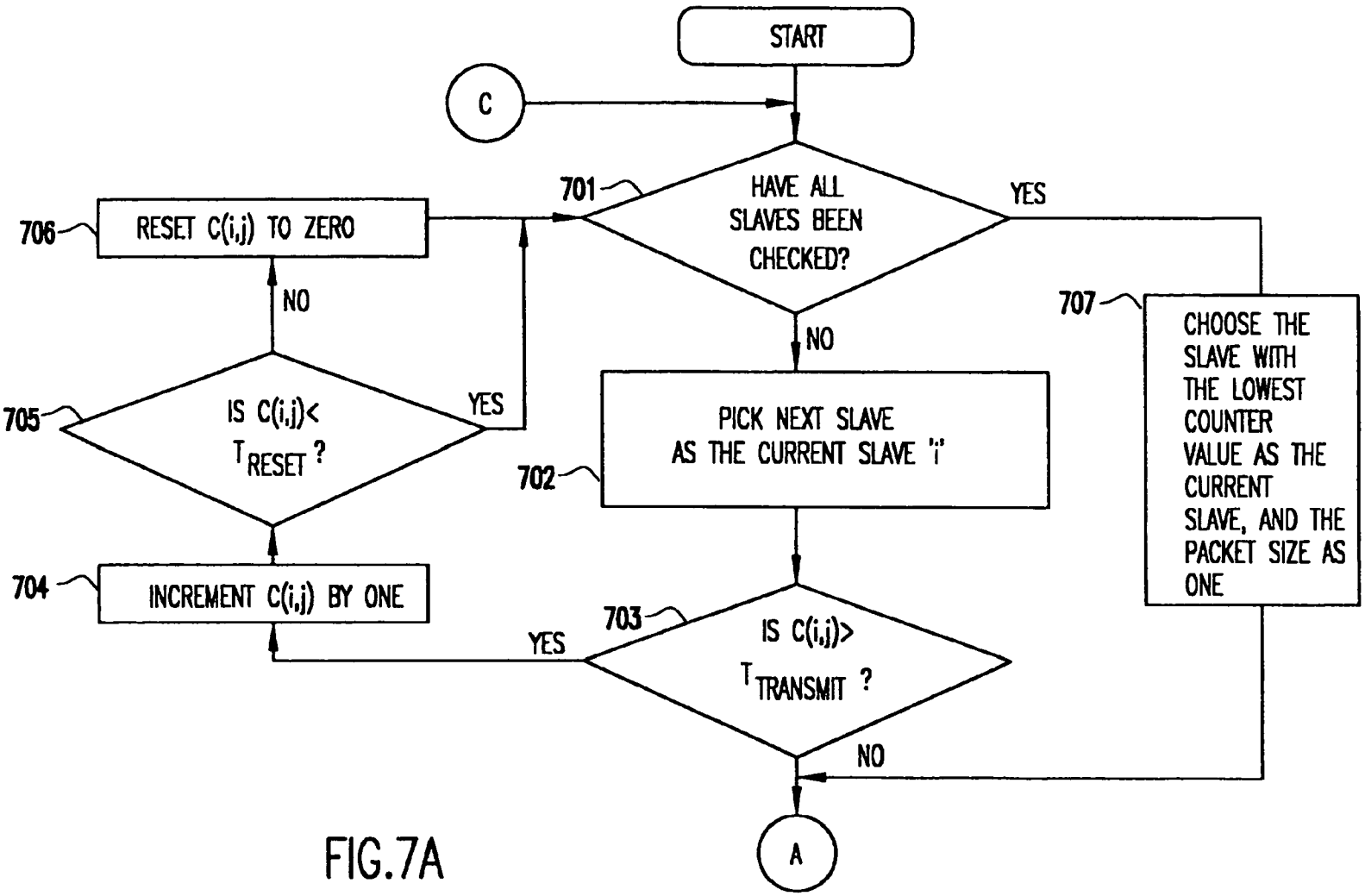
FIGS. 7A, 7B and 7C, taken together, are a flowchart of slave selection and packet size determination using link state history counters.
Figure 7B:
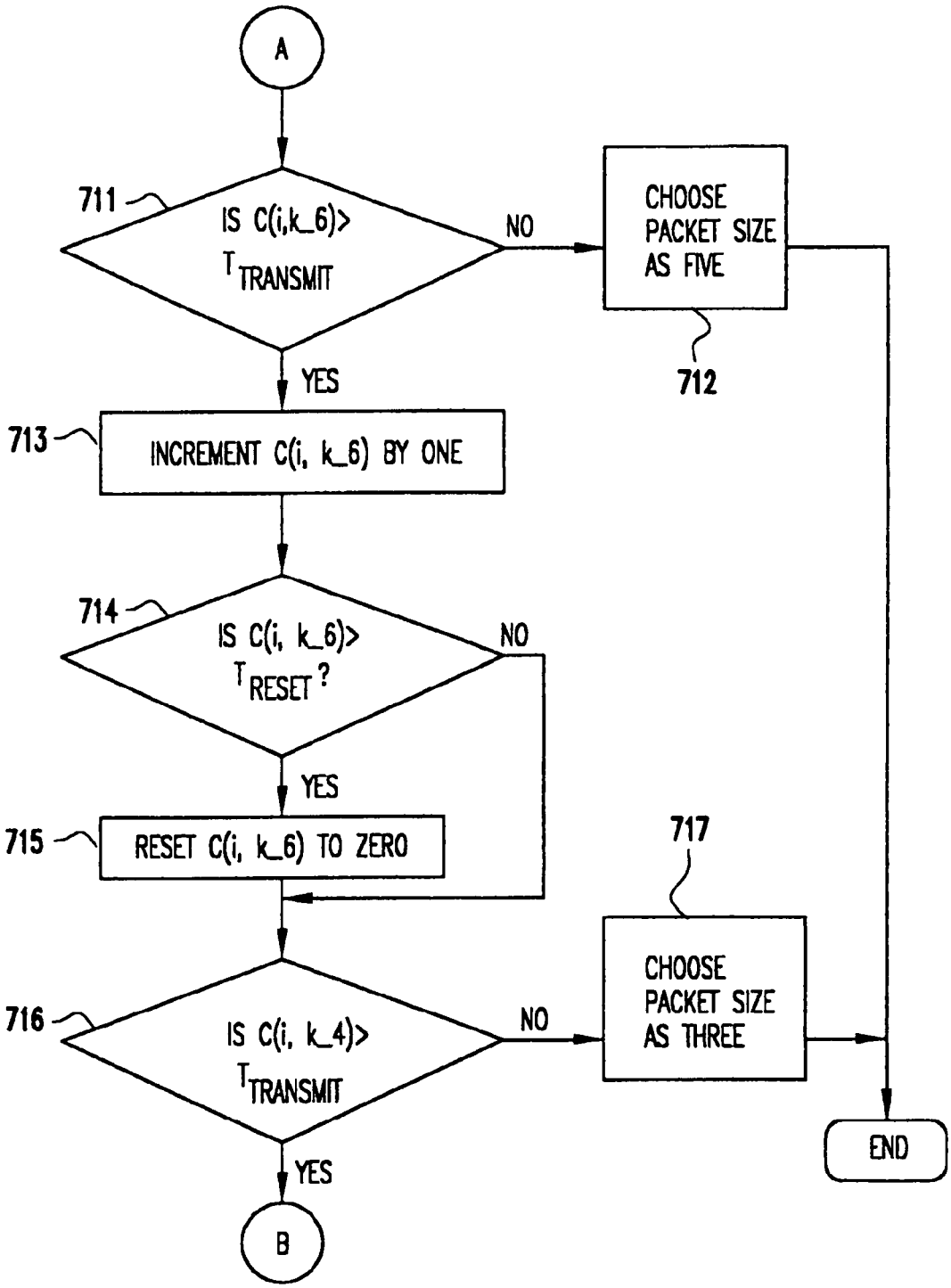
Figure 7C:
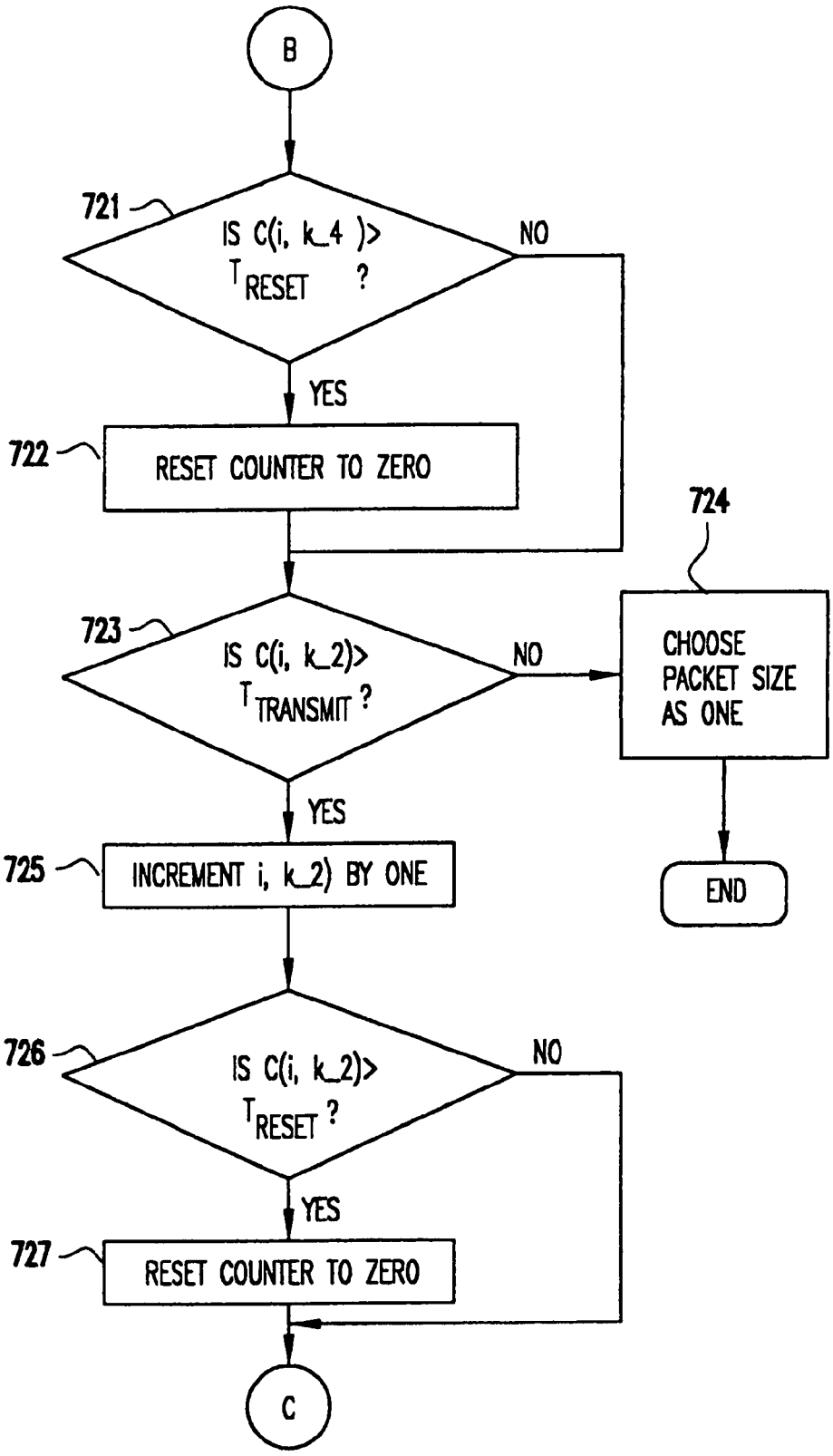

Another feature of the invention comprises the determination of the next slave for transmission and the packet size to be used. The procedures for this are embodied in flowcharts shown in FIGS. 7A to 7C. As illustrated in FIGS. 7A to 7C, before transmission to a slave, the master unit obtains the frequencies corresponding to the time slots which need to be used in the immediate future by using the look-ahead feature described above. As the frequency of transmission for the entire packet is the same as that for the first time slot even if a three or five size packet is transmitted, the master need only to check if the frequency corresponding to the first time slot is good for transmission. Further, as the slave to which the master has transmitted is required to transmit at the time slot immediately following the last time slot used by the master, that time slot should also be good if the communication between the master and the slave is to be successful. Therefore, frequency look-ahead is required for the first time slot after the last time slot used by the currently transmitting slave, and for second, fourth or sixth time slots if the master is to transmit one, three or five sized packets, respectively.

Slave Selection

The first processing loop shown in FIG. 7A determines slave selection using link state history counters. The process begins with decision block 701 in which a determination is made as to whether all slaves have been checked. If not, the next slave is picked as the current slave "i" in function block 702. A test is then made in decision block 703 as to whether the value of counter C(i,j) exceeds the threshold $T_{TRANSMIT}$. If so, the counter C(i,j) is incremented by one in function block 704, and then a test is made in decision block 705 to determine if the value of counter C(i,j) is less than $T_{RESET}$. If not, the counter C(i,j) is reset to zero in function block 706 before the process loops back to decision block 701; otherwise, the process loops back to decision block 701 directly. If all slaves have been checked, then the slave with the lowest counter value is chosen as the current slave and the packet size is set to one in function block 707.

After look-ahead of the transmission frequency $f_j$, the master selects a slave for transmissions as per the flowchart embodied in FIG. 7A. If the link state history counter for this slave "i" at the expected transmission frequency $f_j$ indicates that a transmission attempt can be made, (i.e., value in C(i,j) is less than or equal to $T_{TRANSMIT}$) the master proceeds to transmit to the slave at an appropriate packet size. But, if the counter value forbids transmission, the master increments the counter C(i,j) by one. If after the increment operation the counter value becomes greater than $T_{RESET}$, it is reset to zero. Then the master tries to choose another active slave if any for transmission. In this case, the loss of service by the intended slave and gain of service by another slave can be recorded to address the issue of service fairness as per any suitable policy. In the event that no other slave can be found, the master chooses the slave whose link state history counter has the lowest value and decides on a packet size of one.

Packet Size Selection

Continuing the description of the flow chart, the process next goes to FIGS. 7B and 7C, where the packet size determination is done using the link state history counters. In these figures, the frequencies on which the slave has to respond if the master transmitted one, three or five size packets are called, respectively, $f_{k_2}$,$f_{k_4}$ and $f_{k_6}$. Now, a test is made in decision block 711 to determine if the value of counter C(i, k_6) is greater than the threshold $T_{TRANSMIT}$. If not, the packet size is set to five in function block 712; otherwise, the counter C(i,k_6) is incremented by one in function block 713. A test is made in decision block 714 to determine if the value of counter C(i,k_6) exceeds the threshold $T_{RESET}$. If so, counter C(i,k_6) is reset to zero in function block 715; otherwise, no change is made to the counter. A further test is made in decision block 716 to determine if the counter C(i,k_4) is greater than the threshold $T_{TRANSMIT}$. If not, the packet size is chosen as three in function block 717; otherwise, the process goes to decision block 721 in FIG. 7C where a test is made to determine if counter C(i,k_4) is greater than the threshold $T_{RESET}$. If so, the counter is set to zero in function block 722; otherwise, no change is made to the counter. A further test is made in decision block 723 to determine if the value of counter C(i,k_2) is greater than the threshold $T_{TRANSMIT}$. If not, the packet size is chosen as one in function block 724; otherwise, the counter C(i,k_2) is incremented by one in function block 725. A test is next made in decision block 726 to determine if the value of counter C(i,k_2) exceeds the threshold $T_{RESET}$. If so, the counter is reset to zero before the process loops back to decision block 701 in FIG. 7A; otherwise the process loops back to decision block 701 without making any change to the counter.

As indicated in the flowcharts of FIGS. 7B and 7C, once the slave for transmission has been determined, the master considers the sixth time slot frequency $f_{k_6}$ and finds its transmission worthiness for the slave by referring to the corresponding link state history counter C(i,k_6). If the frequency is found good, the master chooses to transmit a five size packet to the slave; otherwise, the master increments the counter C(i,k_6) by one and if after the increment operation the counter value becomes greater than $T_{RESET}$, it resets the counter to zero, and then proceeds to check the fourth time slot frequency $f_{k_4}$ for transmitting a three size packet. If the fourth time slot frequency is good, a three size packet is chosen for transmission. In the event that even that frequency is bad, C(i,k_4) is incremented by one and reset to zero if its value is greater than $T_{RESET}$ after increment operation. Then, the master considers the second time slot frequency $f_{k_2}$, and if found good, chooses a packet of size one to transmit. If however $f_{k_2}$ is also bad, the master increments the counter C(i,k_2) by one and if after the increment operation the counter value becomes greater than $T_{RESET}$, it resets the counter to zero, and then proceeds to choose another slave for transmission. It may be noted that when a multi-slot packet is chosen, some frequencies corresponding to intermediate time slots are masked with reference to any interference. Thus, if a five-slot packet is chosen, the transmission is independent of interference in frequencies corresponding to the second through fifth slots. Similarly, with a three-slot packet, interference for second and third slot frequencies does not affect the packet transmission.

Goodness Counter Based Link State History

Another embodiment of the invention is an alternative method of maintaining short term link state history which involves transfer of link state information between the different slaves and the master. Every active slave is required to monitor the transmissions from the master in expectation of a packet being sent to it. If a packet is not meant for a slave, then it can go to sleep state until the next packet transmission from the master. In this alternative method of link state history maintenance, slave "i" maintains a "goodness" counter GC(i, j) for each frequency $f_j$. The counter GC(i,j) is incremented every time the slave "i" successfully receives a valid packet header from a master transmission on frequency $f_j$. However, if an error in receiving packet header is detected the goodness counters are unaltered. An error in receiving a master's packet header can occur if there is interference in the master's transmission frequency or if the even numbered time slot is being used by another slave to transmit a three or five sized packet. The counter is also incremented when a packet transmitted by the slave "i" on frequency $f_j$ is successfully acknowledged by the master.

In this method, in response to periodic requests by the master, the active slaves in the pico-cell send the values of the goodness counters to the master. After successfully transmitting the goodness counter values, each slave resets its goodness counters to zero for link state monitoring during the next period of communication. The values of the counters received from all the slaves are compiled by the master to form a link state history table of goodness counters as shown in Table 2 for use during the next scheduling period. In Table 2, GC(i,j) is the goodness counter for the link state of frequency $f_j$ for slave i.

TABLE 2

Link State History Table of Goodness Counters

| | $f_1$ | $f_2$ | $f_3$ | ... | $f_{78}$ | $f_{79}$ |
|---|---|---|---|---|---|---|
| SLAVE 1 | GC(1,1) | GC(1,2) | GC(1,3) | ... | GC(1,78) | GC(1,79) |
| SLAVE 2 | GC(2,1) | GC(2,2) | GC(2,3) | ... | GC(2,78) | GC(2,79) |
| SLAVE 3 | GC(3,1) | GC(3,2) | GC(3,3) | ... | GC(3,78) | GC(3,79) |
| SLAVE 4 | GC(4,1) | GC(4,2) | GC(4,3) | ... | GC(4,78) | GC(4,79) |
| SLAVE 5 | GC(5,1) | GC(5,2) | GC(5,3) | ... | GC(5,78) | GC(5,79) |
| SLAVE 6 | GC(6,1) | GC(6,2) | GC(6,3) | ... | GC(6,78) | GC(6,79) |
| SLAVE 7 | GC(7,1) | GC(7,2) | GC(7,3) | ... | GC(7,78) | GC(7,79) |

s the number of bits in the counter is to be limited to minimize the overhead in transmitting the information to the master, the counters GC(i,j) are allowed to count up to the maximum value and stay there until reset. The value of any counter GC(i,j) received by the master indicates the relative goodness of the link between the master and slave "i" on the frequency $f_j$; the higher the count value, the better the link. In this method, as the slaves listen to all the master transmissions and record the successful transmissions, the monitoring of interference on different frequencies occurs more frequently, and therefore results in better characterization of the link states.

Slave Selection Based on Goodness Counters

Figure 8A:
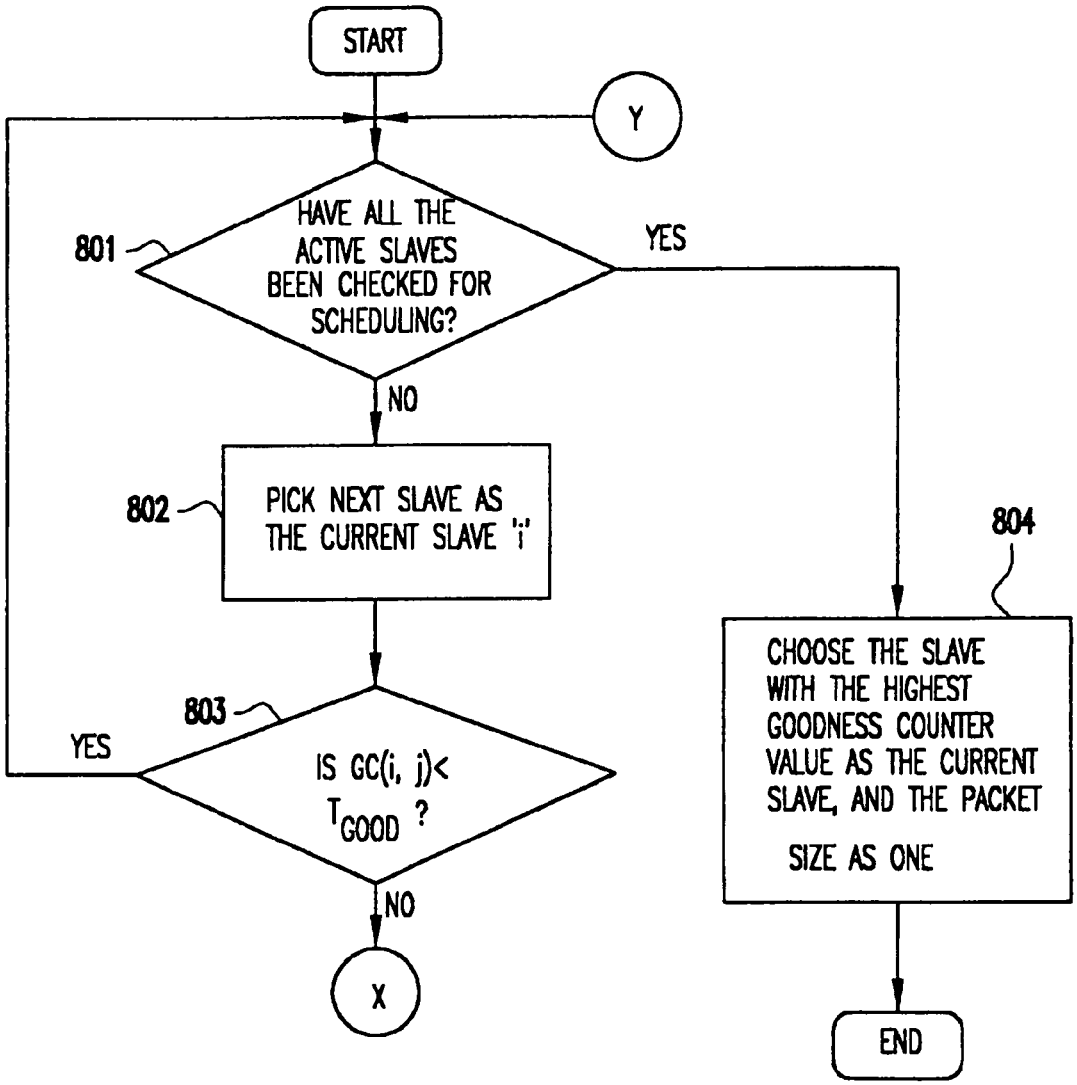
FIGS. 8A and 8B, taken together, are a flowchart of slave selection and packet size determination using goodness counter values.

A flowchart for selection of a slave for packet transmission is shown in FIG. 8A. A test is made in decision block 801 to determine if all the active slaves have been checked for scheduling. If not, the next slave is picked as the current slave "i" in function block 802. A test is then made in decision block 803 to determine if the value of counter GC(i,j) is less than the threshold $T_{GOOD}$. If so, the process loops back to decision block 801; otherwise, the process goes on to the flowchart of FIG. 8B. If all the active slaves have been checked for scheduling, as determined in decision block 801, the slave with the highest goodness counter value is chosen as the current slave in function block 804. The packet size is set to one.

In the process shown in FIG. 8A, the master picks up the next slave for transmission from among the currently active slaves. The first slave for which the value of goodness counter GC(i,j) for the frequency of transmission $f_j$ is greater than or equal to a minimum goodness threshold value $T_{GOOD}$ is chosen and a suitable packet size decided next. If however none of the slaves' goodness counter value is greater than or equal to $T_{GOOD}$, the master chooses the slave with the highest value of the goodness counter and decides on a packet size of one.

Packet Size Selection Based on Goodness Counters

Figure 8B:
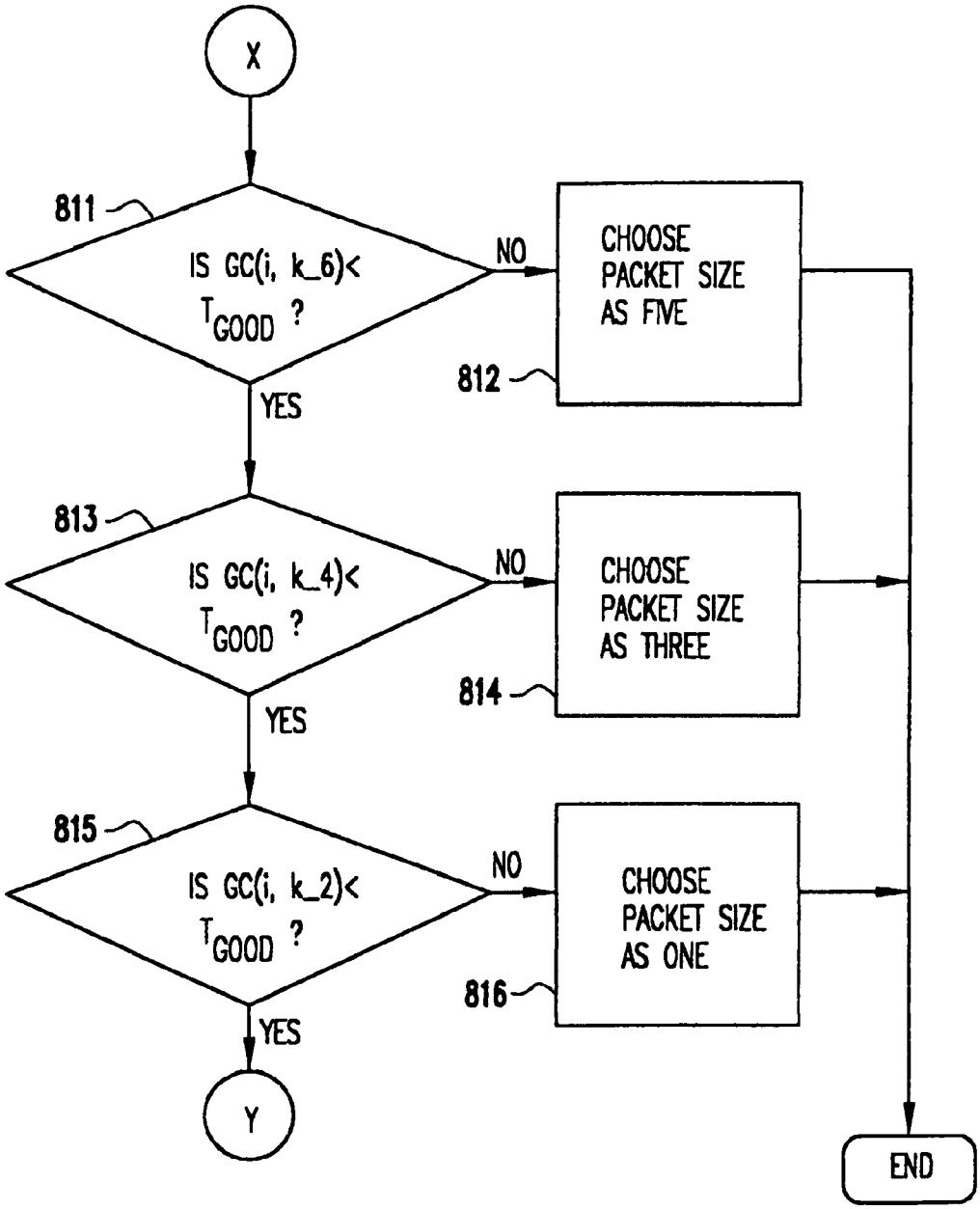

As shown in FIG. 8B, the master first checks in decision block 811 if the slave's response frequency $f_{k_6}$ is good as indicated by the value of the counter GC(i,k_6). If the value of the goodness counter GC(i,k_6) is greater than or equal to $T_{GOOD}$ then the master takes the decision of sending a five-slot packet in function block 812. If however GC(i,k_6) value forbids the transmission of a five-slot packet, then the master checks in decision block 813 for the value of the goodness counter GC(i,k_4). If GC(i,k_4) value is greater than or equal to $T_{GOOD}$, then the master takes the decision of sending a three-slot packet in function block 814. However, if GC(i,k_4) value also forbids transmission, the master checks in decision block 815 for the value of the goodness counter GC(i,k_2) for transmitting a one-slot packet and, if possible, chooses a one size packet in function block 816. In the event that even GC(i,k_2) value is also below $T_{GOOD}$, the master does not transmit to the particular slave, and proceeds to choose another slave for transmission by looping back to decision block 801 of FIG. 8A.

Second Level Look-Ahead

Figure 9:
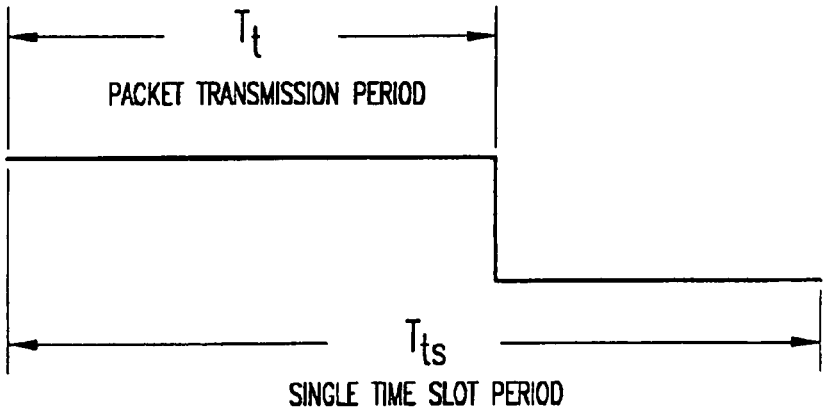
FIG. 9 is a timing diagram showing transmission time within a time slot.

Generally, a single time slot packet transmission occurs within the first time period $T_t$, out of the total time slot period of $T_{ts}$, as shown in FIG. 9. Thus, time period of $(T_{ts}-T_t)$ is available for any processing after completely receiving a packet. However, the packet size being transmitted is known by the receiving unit as soon as the packet header is received during the beginning of the time slot. Therefore, the processor in the master can perform the processing required to decide the choice of slave and packet size to be transmitted soon after receiving the header of a packet sent by a slave. This provides a time period of at least about one time slot for deciding about the next slave and slot size. However, a second level of look-ahead can be performed as described below to accommodate slower speed processors.

Figure 10:
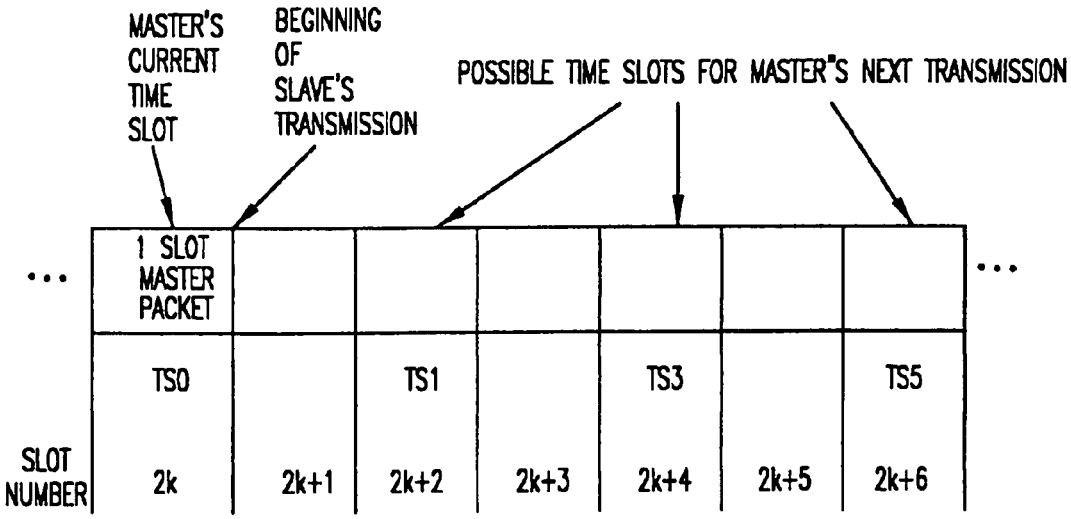
FIG. 10 is a timing diagram showing a master's next transmission time slots.

As shown in FIG. 10, after a master transmits a packet in time slot TS0, the next possible time slots for its transmission are TS1, TS3 or TS5 depending on whether the addressed slave transmits a one, three, or five slot packet, respectively. Therefore, soon after the master's transmission in slot TS0, a look-ahead for frequencies of transmission during TS1, TS3, and TS5 can be performed and the corresponding slave(s) and packet sizes can be determined in advance. This method provides at least about a time period of two time-slots for the required processing steps.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A frequency hopping time division duplex indoor wireless communication system comprising:

a master unit having a processor and a first frequency selection unit for finding a current frequency on which to transmit and receive during a current time slot and at least a second frequency selection unit interfaced with said processor to look ahead at frequencies that are to be used in future time slots; and a plurality of mobile stations communicating with said master unit.

2. The communication system recited in claim 1, wherein the first and second frequency selection units comprise combinatorial logic units to perform frequency hop selection according to predetermined standards.

3. The communication system recited in claim 1, wherein the processor in the master unit interfaced to the second frequency selection unit cooperate such that a frequency corresponding to a future time slot is obtained by the processor by providing binary information about a pico-cell related address bits and clock bits corresponding to the time slot.

4. A frequency hopping indoor wireless communication system comprising:

a master unit and a plurality of slave units;

said master unit having a plurality of link state counters C(i,j), wherein the condition of wireless links between the master unit and a slave unit are recorded in link state counters provided one for each frequency of communication $f_j$ between the master and the slave "I".

5. The frequency hopping indoor wireless communication system recited in claim 4, wherein 1. the link state counters are initially reset to zero,
2. a counter C(i,j) is incremented by one when the master unit finds that a current transmission/reception with reference to slave unit "i" on frequency $f_j$ failed, and
3. the counter C(i,j) is reset to zero when the current transmission/reception with reference to slave unit "i" on frequency $f_j$ is successful or when the count value exceeds a reset threshold $T_{RESET}$.

6. The frequency hopping indoor wireless communication scheme recited in claim 5, wherein 1) a transmission attempt is made to slave unit "i" on frequency $f_j$ if a value of the counter C(i,j) is less than or equal to a threshold $T_{TRANSMIT}$, and 2) no transmission attempt is made to slave unit "i" on frequency $f_j$ if the value of the counter C(i,j) is greater than the threshold $T_{TRANSMIT}$, and the counter C(i,j) is incremented by one.

7. A frequency hopping time division duplex master-slave indoor wireless communication system comprising:

a master unit having a processor and a first frequency selection unit for finding a current frequency on which to transmit and receive during a current time slot and at least a second frequency selection unit interfaced with said processor to select frequencies to be used in future time slots; and a plurality of slave units communicating with said master unit, said master unit having a plurality of link state history counters C(i,j), wherein the link state counters are provided one for each frequency of communication $f_j$ between the master and the slave "i", wherein a) before transmission to a slave unit, the master unit obtains the frequencies corresponding to time slots which will be encountered in the immediate future, b) if the link state history counter for a scheduled slave unit at an expected transmission frequency indicates that a transmission attempt can be made, the master unit proceeds to transmit to the slave unit at an appropriate packet size, c) the master unit tries to choose another active slave unit, if any, for transmission if the link state history counter for the scheduled slave forbids transmission, d) the master unit records the loss and gain of service by the slave units when transmission to slave units takes place in an order different from the regular scheduling order, and e) if the link state history counter values of all active slave units are above a threshold $T_{TRANSMIT}$, the master unit chooses a slave unit whose link state history counter has the lowest value, and decides on a packet size of one.

8. The frequency hopping time division duplex master-slave indoor wireless communication system recited in claim 7, wherein f) after a slave unit for transmission is chosen by the master unit based on a link state history corresponding to a frequency to be used in a first time slot after a last time slot used by a current slave unit, the master unit checks for transmission worthiness for the slave at the frequency corresponding to an n-th time slot for transmitting an (n−1) size packet, and chooses the highest packet size corresponding to which the link state history counter value is less than or equal to a threshold $T_{TRANSMIT}$, and g) if all frequencies corresponding different allowed packet sizes are such that the corresponding link state history counter values are above the threshold $T_{TRANSMIT}$, the master unit proceeds to choose another slave unit for transmission.

9. A frequency hopping time division duplex master-slave indoor wireless communication system comprising:

a master unit and a plurality of slave units, wherein (a) every active slave unit monitors packet transmissions from the master unit and records the number of successful receptions by using goodness counters GC(i,j) for every slave unit "i" with reference to frequency $f_j$, (b) a slave unit increments a goodness counter GC(i,j) when a packet transmitted by the slave unit on frequency $f_j$ is successfully acknowledged by the master unit, (c) short-term link history is maintained by periodic transfer of goodness counter values from active slave units to the master unit, (d) the master unit constructs a link state history table of counters after receiving values of goodness counters GC(i,j) from all the slave units and uses this information during a next scheduling period, (e) goodness counters GC(i,j) are reset to zero by slave units after successfully transmitting their values to the master unit, and (f) the goodness counters GC(i,j) are allowed to count up to the maximum value and stay there until reset.

10. The indoor wireless communication system recited in claim 9, wherein (g) from among the currently active slave units, a first slave unit for which a value of goodness counter GC(i,j) for the frequency of transmission $f_j$ is greater than or equal to a minimum goodness threshold value $T_{GOOD}$ is chosen for communication starting from a next transmission time slot of the master unit, (h) if, however, none of the slave units' goodness counter values is greater than or equal to the threshold value $T_{GOOD}$, the master unit chooses a slave unit with a highest value of the goodness counter and decides on a packet size of one, (i) after the slave unit for transmission is chosen by the master unit based on goodness counter values, the master unit checks for transmission worthiness for the slave unit at the frequency corresponding to an n-th time slot for transmitting an (n−1) size packet, and chooses a highest packet size corresponding to which a goodness counter value is greater than or equal to the threshold $T_{GOOD}$, and (j) if all frequencies corresponding different allowed packet sizes are such that the corresponding goodness counter values are below the threshold $T_{GOOD}$, the master unit proceeds to choose another slave unit for transmission.

11. A frequency hopping time division duplex master-slave indoor wireless communication system comprising:

a master unit and a plurality of slave units, wherein (a) a second level frequency look-ahead is performed by the master unit even before a packet from an addressed slave unit is received, and (b) the second level look-ahead is performed by the master unit to determine the slave units and packet sizes to be used next corresponding to the different sizes of packet that might be transmitted by an addressed slave unit.

12. A frequency hopping time division duplex master-slave indoor wireless communication system as recited in claim 11 wherein the master unit maintains an expected state of wireless links with reference to interference by using a table of counters whose values indicate goodness of links.

*13. A communication device employing a frequency hopping sequence to communicate with other communication devices in a wireless communications system, the device comprising:*

*a processor;*

*a first frequency selection unit coupled to the processor for determining a frequency to transmit or receive messages during a current time slot; and*

*a second frequency selection unit coupled to the processor for determining one or more future frequencies to transmit or receive messages during look-ahead time slots.*

*14. The communication device of claim 13, wherein the first and second frequency selection units comprise combinatorial logic units to perform frequency hop selection according to predetermined standards.*

*15. The communication device of claim 13, wherein the processor obtains a frequency corresponding to a future time slot by using binary information about a pico-cell related address bits and clock bits corresponding to the time slot.*

*16. A wireless communications system having a plurality of communication devices, comprising:*

*a link state database for containing values representing link states of the plurality of communication devices;*

*a first communication device for updating the link state database in accordance with condition of messages exchanged between the devices of the plurality of communication devices; and*

*a device selection module having a predetermined rule operative to select a second communication device in accordance with values of the link state of the plurality of communication devices,*

*wherein the first and second communication device exchange messages if the value of the link state between the first and second devices is less than or equal to a predetermined transmission threshold.*

*17. The wireless communications system of claim 16, wherein a value of the link state of a communication device is incremented when the messages received from the communication device is absented or corrupted.*

*18. The wireless communications system of claim 17, wherein the value of the link state of the communication device is reset to a predetermined value when the value of the link state exceeds a predetermined reset threshold.*

*19. The wireless communications system of claim 17, wherein the predetermined value is zero.*

*20. The wireless communications system of claim 16, wherein a value of the link state of a communication device is reset to a predetermined value when messages received from the communication device is correct.*

*21. The wireless communications system of claim 16, wherein the predetermined value is zero.*

*22. The wireless communications system of claim 17, wherein the predetermined transmission threshold is less than the predetermined reset threshold.*

*23. The wireless communications system of claim 17, wherein the value of the link state of the second communication device is less than the predetermined transmission threshold.*

*24. The wireless communications system of claim 17, wherein the second communication device is the one having the smallest link state value that is less than a predetermined transmission threshold.*

*25. A wireless communications system having a plurality of communication devices, comprising:*

*a global link state database for containing values representing link states of the plurality of communication devices;*

*a first communication device having a local link state database,*

*wherein the local link state data database contains values representing link states with a second communication device of the plurality of communication device,*

*wherein the values of link states are updated in accordance with condition of messages exchanged with the second communication device, and*

*wherein the values of link states are transmitted in a predetermined time period;*

*a link state database update module for updating the global link state database with the information received from the first communication device; and*

*a device selection module having a predetermined rule operative to select a second communication device in accordance with the values of link states of the plurality of communication devices,*

*wherein the first and second communication device exchange messages.*

*26. The wireless communications system of claim 25, wherein a value of local link state of the first communication device is incremented when messages received or transmitted successfully.*

*27. The wireless communications system of claim 26, wherein the value of local link state of the first communication device is reset to a predetermined value when the value of the local link state is sent to the link state database update module.*

*28. The wireless communications system of claim 27, wherein the predetermined value is zero.*

*29. The wireless communications system of claim 25, wherein the second communication device exchanging message with the first communication device has a local link state value greater than a predetermined transmission threshold.*

*30. The wireless communications system of claim 25, wherein the second communication device exchanging message with the first communication device is the one having a largest local link state value that is less than the predetermined transmission threshold.*

* * * * *